US011332951B2

(12) United States Patent
Jackson (10) Patent No.: US 11,332,951 B2
(45) Date of Patent: May 17, 2022

(54) SYSTEMS AND METHODS FOR SWIMMING POOL FILTRATION

(71) Applicant: David Jackson, Spring, TX (US)

(72) Inventor: David Jackson, Spring, TX (US)

( * ) Notice: Subject to any disclaimer, the term of this patent is extended or adjusted under 35 U.S.C. 154(b) by 0 days.

(21) Appl. No.: 17/018,070

(22) Filed: Sep. 11, 2020

(65) Prior Publication Data

US 2021/0017782 A1    Jan. 21, 2021

Related U.S. Application Data

(63) Continuation-in-part of application No. 16/215,649, filed on Dec. 11, 2018, now abandoned.

(51) Int. Cl.
| | |
|---|---|
| *E04H 4/12* | (2006.01) |
| *C02F 1/40* | (2006.01) |
| *B01D 39/16* | (2006.01) |
| *B01D 29/27* | (2006.01) |
| *C02F 103/42* | (2006.01) |

(52) U.S. Cl.
CPC .......... *E04H 4/1272* (2013.01); *B01D 29/27* (2013.01); *B01D 39/16* (2013.01); *C02F 1/40* (2013.01); *C02F 2103/42* (2013.01)

(58) Field of Classification Search
CPC ...... E04H 4/1272; B01D 29/27; B01D 39/16; B01D 2201/24; B01D 2239/1275; B01D 39/083; B01D 39/10; B01D 2201/4015; B01D 2239/1266; C02F 1/40; C02F 2103/42; C02F 1/001
USPC .......... 210/167.1, 167.19, 416.1, 416.2, 448
See application file for complete search history.

(56) References Cited

U.S. PATENT DOCUMENTS

| | | | | |
|---|---|---|---|---|
| 3,542,201 A | * | 11/1970 | Belonger | B01D 35/26 210/167.1 |
| 3,998,599 A | * | 12/1976 | Fedor | B01J 23/755 422/180 |
| 4,021,354 A | * | 5/1977 | Lyon | B01D 29/055 210/477 |
| 4,325,150 A | * | 4/1982 | Buddy | E04H 4/1272 137/578 |
| 5,672,271 A | * | 9/1997 | Dye | E04H 4/1272 210/167.12 |
| 6,461,501 B1 | * | 10/2002 | Porter | B01D 24/263 210/167.31 |
| 6,592,756 B1 | * | 7/2003 | Felix, Jr. | B01D 29/23 210/167.12 |
| 6,706,174 B1 | * | 3/2004 | Keith | B01D 29/01 210/167.12 |
| 10,722,827 B1 | * | 7/2020 | Hetzner | B01D 29/35 |
| 2002/0048490 A1 | * | 4/2002 | Allard | E03F 5/0404 405/43 |
| 2004/0045895 A1 | * | 3/2004 | Bonelli | B01D 29/23 210/497.1 |

(Continued)

FOREIGN PATENT DOCUMENTS

FR    2948293 A1  *  1/2011

*Primary Examiner* — Fred Prince
(74) *Attorney, Agent, or Firm* — Iaconis Law Office (57) ABSTRACT

Apparatus, systems, and methods for a pool filtration system including a basket with a flexible netting that is customizably designed and versatile in its functionality. The basket can be made from modern plastic or plastic-like materials. The weather-resistant, durable materials benefit the netting design for capturing and holding debris in a pool filtration system.

20 Claims, 5 Drawing Sheets

(56) References Cited

U.S. PATENT DOCUMENTS

| | | | |
|---|---|---|---|
| 2004/0060856 A1* | 4/2004 | Weigeldt | B01D 29/35 210/232 |
| 2004/0128903 A1* | 7/2004 | Wexler | A01M 29/34 43/122 |
| 2006/0124521 A1* | 6/2006 | Hodak | E04H 4/1272 210/167.12 |
| 2008/0283456 A1* | 11/2008 | Charlotin | B01D 29/114 210/167.12 |
| 2010/0059429 A1* | 3/2010 | Barry | E04H 4/1254 210/167.1 |
| 2013/0020242 A1* | 1/2013 | Vreeland | E03F 5/0404 210/163 |
| 2014/0158595 A1* | 6/2014 | Stroeder | E04H 4/1263 210/167.19 |
| 2015/0167279 A1* | 6/2015 | Goebel | A01K 13/001 4/292 |
| 2016/0010353 A1* | 1/2016 | Giroux | B01D 29/23 4/494 |
| 2016/0023138 A1* | 1/2016 | Kurani | B01D 29/27 210/167.1 |

* cited by examiner

SYSTEMS AND METHODS FOR SWIMMING POOL FILTRATION

CROSS-REFERENCE TO RELATED APPLICATION

This application is a continuation-in-part of U.S. patent application Ser. No. 16/215,649 filed Dec. 11, 2018, which claims the benefit of U.S. Provisional Application No. 62/597,401 filed Dec. 11, 2017.

FIELD OF THE DISCLOSURE

The present invention is generally related to the field of swimming pool filtration.

BACKGROUND

From time to time, swimming pools receive unwanted deposits such as leaves, twigs, and other debris. If left ignored, this debris detracts from the enjoyment of the pool, dirty the pool, and can have the potential to damage the filtration system, which circulates water into and throughout the pool. Swimming pools must include devices to filter the water in order to maintain a sanitary experience for swimmers. Generally, this is accomplished by the use of water pumps to bring the water to the filtration system and then reintroduce the filtered water back into the pool. However, any debris small enough to fit into the filtration channel could cause damage if it were to reach the water pumping mechanisms. Traditional solutions to this problem have been to include a filter basket to catch debris in the channel before the debris can cause any damage.

A swimming pool filter basket enables pool water circulation from an opening in the side of the pool, through the skimmer into underground plumbing through the electric pump and filtration system, and back to the pool through jets in the side walls of the pool. The skimmer basket is typically held in the skimmer cavity on a circular ledge that is slightly narrower than the diameter of the skimmer basket. The skimmer is accessed through an opening in the pool deck and is covered with a plate or other covering to prevent anything (or anyone) from getting into the hole.

The skimmer basket is required to be periodically emptied of unwanted organic or inorganic material that is captured from the surface of the swimming pool to allow proper circulation of the water thru the skimmer cavity. Otherwise, the skimmer cavity would become blocked and restrict the circulation flow of water.

Existing swimming pool filter baskets are generally manufactured as rigid plastic cylindrical or rectangular shapes, with an open top and holes in the sides and bottom arranged in a grid pattern. The holes are designed to allow water to pass through when there is debris in the basket. However, some debris (small leaves, small twigs, seeds, husks, etc.) are small enough to pass through these holes. Any debris that passes through the filter may cause undue wear and tear on the secondary pool filtration system and other mechanical parts of the pump system, including breakage or other temporary or permanent damage. Another difficulty with existing swimming pool filter baskets is the rigid plastic design. The rigidity means that the basket is susceptible to breaking by accidental use, or even by long-term use of the basket. The harsh effects of chlorine or saltwater, prolonged exposure to outdoor elements including sunlight, ultraviolet rays, and temperature extremes, along with the pressure and weight of repeated baskets full of debris make the rigid plastic basket more brittle and prone to more breaks in the basket.

Sometimes the skimmer basket, containing plant debris, bugs, rodents, reptiles, pool toys and other unknown and undesirable contents, is required to be emptied at night. Since it is dark outside and there is no light in the skimmer cavity, the pool owner is required to insert their hand into the dark, often cold, skimmer cavity to retrieve the skimmer basket full of the undesirable organic or inorganic matter.

BRIEF SUMMARY OF THE DISCLOSURE

Some or all of the above needs and/or problems may be addressed by certain embodiments of the disclosure. Certain embodiments can include apparatus and methods for a swimming pool filter basket. According to one embodiment of the disclosure, there is disclosed a basket. The basket can include a netting that is primarily composed of a plastic or other similar material. The netting can be coupled to a rim, which can be primarily plastic or similar material, and the combined basket can fit into the basket-holding cavity of a swimming pool.

According to another embodiment of the disclosure, there is disclosed a method. The method can include configuring the rim and netting to fit into the basket-holding cavity of a swimming pool. The method can also include coupling the rim and netting together.

Other embodiments, apparatus, methods, aspects, and features of the disclosure will become apparent to those skilled in the art from the following detailed description.

BRIEF DESCRIPTION OF THE DRAWINGS

The detailed description is set forth with reference to the accompanying drawings, which are not necessarily drawn to scale. The use of the same reference numbers in different figures indicate similar or identical terms.

DETAILED DESCRIPTION

Illustrative embodiments of the disclosure will now be described more fully hereinafter with reference to the accompanying drawings, in which some, but not all, embodiments of the disclosure are shown. The disclosure can be embodied in many different forms and should not be construed as limited to the embodiments set forth herein;

rather, these embodiments are provided so this disclosure will satisfy applicable legal requirements.

Certain embodiments disclosed herein relate to a swimming pool filter basket. Accordingly, an apparatus can be provided to be used as the filter basket for a swimming pool. For example, the basket-holding cavity of a swimming pool can be capable of fitting a universal size basket into the cavity. The apparatus can also be constructed to fit any non-universal sized swimming pool basket cavities. The apparatus can be constructed or configured to fit into any size filtration cavity for in-ground and above-ground swimming pools, residential, commercial, and industrial pools and recreational bodies of water that require filtration systems. The filter basket, as well as its component net, rim, and handle parts, can be round, rounded, oval, or specifically configured to fit into the particular cavity. The rim can be of a completely, or partially, solid construction, and can be of varying thickness. The basket can include surfaces to receive markings or writing that can include advertising and/or description of the design of that particular basket. The basket netting can be longer or shorter in depth, depending on factors such as the dimensions of the filtration cavity and the amount of debris to be handled by the basket. The basket net can be woven, knitted, sewn, 3-D printed, or otherwise constructed to achieve the desired size, design, and purpose. For example, the holes of the netting can be of varying size and shape depending on the type of debris to be filtered. The netting can be permanently or removably attached to the rim, and attachment can include mechanical attachment such as protrusions, clamps, ties, and pins, adhesive attachment or welding, individually or in combination. The components of the basket can be replaced individually, if necessary.

The netting material is strong enough to withstand above average amounts of pressure. In stress tests, the material did not fail with 10-15 pounds of pressure. Additionally, tests were also conducted with jagged edge debris, such as rocks that included pointed surfaces. These jagged rocks with weights between 5 and 15 pounds were easily withheld by the netting, which withstood all these forces and suffered no damage.

Skimmer baskets require surface water to flow from the main body of the pool into the skimmer cavity and through the skimmer basket, where larger debris and particulate matter are initially collected. The water is drawn through holes in the bottom of the skimmer cavity, through underground water pipes thru the main closed and pressurized filtration unit comprised of varying types of filtration media, such as cartridges, sand, diatomaceous earth (DE), etc. The pump the pushes the water back to the pool through additional underground piping, through several water jet holes in the side of the pool, which create the circulation needed to draw the water back through the skimmer cavity and skimmer basket 100. This circulation and multilevel filtration processes continue as long as the pool pump is operating. Some pumps can operate at variable speeds, and others must be set to a singular operating speed.

Pool pump manufacturers recommend certain water flow rates to keep the pool water chemically balanced and clean. These guidelines are typically presented in gallons per minute or gallons per hour. The faster the rate of water flow, the greater the pressure exerted on the skimmer basket 100 as it performs its function and fills with debris over time, constricting water flow and creating downward pressure on the skimmer basket 100. The rate of water flow varies depending on the size of the pool, i.e., 15,000 gallon pools circulate smaller volume of water over a defined period of time than do 25,000 gallon pools over the same defined period of time.

Pools typically operate at a flow rate through the skimmer cavity(s) up to 75 to 125 gallons per minute, or less, depending on the size of the pool. A gallon of water weighs 8.3453 pounds. The weight of the water drawn through the skimmer basket cavity at these two flow rates is 625.9 pounds of water at a flow rate of 75 gallons per minute to 1,043.2 pounds of water at a flow rate of 125 gallons per minute. This can be converted to respective pounds per second of 10.4 to 17.4 pounds per second. Water flows through an empty basket 100 with virtually no resistance except for the minor amount created by the lip of the rim 120. However, the pressure on the skimmer basket 100 increases as the filter basket fills with debris, constricting water flow. In field tests, skimmer baskets 100 installed in pools had no net failures or ruptures occurred as a result of varying circulation pressure, pool conditions, debris levels, or debris types in the skimmer basket 100.

The net 110 that comprises the basket portion of the filter basket 100 provides superior filtration and tensile strength. In tests, a skimmer basket 100 in continual use for over four months was removed from its skimmer cavity and used for testing. In one test performed, the net portion 110 of the basket 100 was filled to above the rim 120 with broken, jagged concrete rock chips ranging in approximate size from one to two inches and comprising a total weight of approximately 10.8 pounds. When held by the handle 130 with no other support, the handle, rim and net withstood the weight of the material, with no rupture, cracks, or failures of any component part of basket 100.

To further test the dry weight strength and durability of basket 100, the basket 100 filled with the previously mentioned concrete rock chips was dropped and allowed to freefall, basket side down, onto a hard wooden surface from separate distances of three inches, six inches, and twelve inches. After separate and thorough inspections of the net 110 and all other basket 100 component parts and connections, no failures, ruptures, holes (other than those designed to exist in the manufacture of the net material), breaks, or other abnormalities resulted from all three freefall drops previously mentioned.

Additional testing occurred to include filling basket 100 to the level of the upper rim with "pea pebbles," a material comprised of small rocks in varying sizes of approximately 1/16 inch or less. The weight of the pea pebble material was approximately 12.4 pounds. Basket 100 was allowed to freefall, basket side down, onto a hard wooden surface from separate distances of three inches, six inches, and twelve inches. After separate and thorough inspections of the net 110 and all other basket 100 component parts and connections, no failures, ruptures, holes (other than those designed to exist in the manufacture of the net material), breaks, or other abnormalities were found as a result of all three freefall drops. In addition, no pea gravel escaped when the holes were heterogeneously stretched, nor when the holes were homogeneously stretched by the weight of the material in the net portion 110 of basket 100.

After all tests were performed, basket 100 was returned to its original swimming pool skimmer cavity from which it was extracted to continue to perform the debris collection functions for which it was originally designed.

Additional underwater tests were performed under actual operating conditions with the pool pump powered on using the same concrete and rock material that was used in the dry weight testing above.

Basket 100 was suspended into the skimmer cavity on a tripod placed over the skimmer cavity opening on the pool deck. The skimmer basket 100 was held in place by a small chain weighing approximately eight ounces. The chain was attached to a handheld tare weight scale which was in turn attached to the tripod. The rim 120 of the basket 100 was submerged in the water to less than one inch above the inner lip of the skimmer cavity upon which the skimmer basket 100 can rest during normal operation. The purpose of this simulation was to measure the downward force exerted on the skimmer basket netting 110 as increasing amounts of weight were introduced to the skimmer basket 100 under the pressure created by the flow of water. The size of the pool was approximately 25,000 gallons, and the pool pump flow rate was set to 2,750 RPM, which translates to approximately 75 to 100 gallons of water flow per minute into the skimmer cavity throughout the wet testing.

During one test, approximately one quarter of net 110 was filled with chipped concrete and rock material by dropping it into the skimmer cavity water which began to fill the skimmer basket 100 while it was suspended into the skimmer cavity from the chain as described above. The downward weight of the concrete combined with the downward pressure created by the water flow was approximately 1.9 pounds of combined pressure. This test was repeated with approximately one half of a basket 100 full of chipped concrete and rock material under the same conditions. Basket 100 withstood the approximately 4 pounds of combined weight and pressure that was generated. A third wet test was performed with basket 100 filled to the brim with concrete and rock material to determine the impact of extreme water pressure, weight, and jagged materials on the basket 100 and related netting 110. The combined pressure from the flow of the water and the weight of the materials used in the net basket 100 totaled 12.5 pounds.

Based on the dry weight drop testing and the wet weight water pressure testing, the basket net 110 survived all of these conditions and circumstances without any tears, punctures, rips, slices, or any other disruption of the original interwoven characteristics or plastic thread properties of the net 110 from its original manufactured form. Additionally, the rim 120, lower housing, and net attachment system remained intact, without breaking, fracturing, cracking, or any other disruption from its originally manufactured form.

Basket 100 is made from materials resistant to chemicals that include chlorine, salt, alkaline powders, and other chemicals commonly used in pool waters. In one embodiment, concentrated chlorine tablets were regularly placed directly into net 110. As the chlorine tablets dissolved into the pool water, they were replaced with new, undissolved chlorine tablets. This was repeated over a period of two years without any adverse effect on the net 110 or other component parts of basket 100.

Figure 1A:
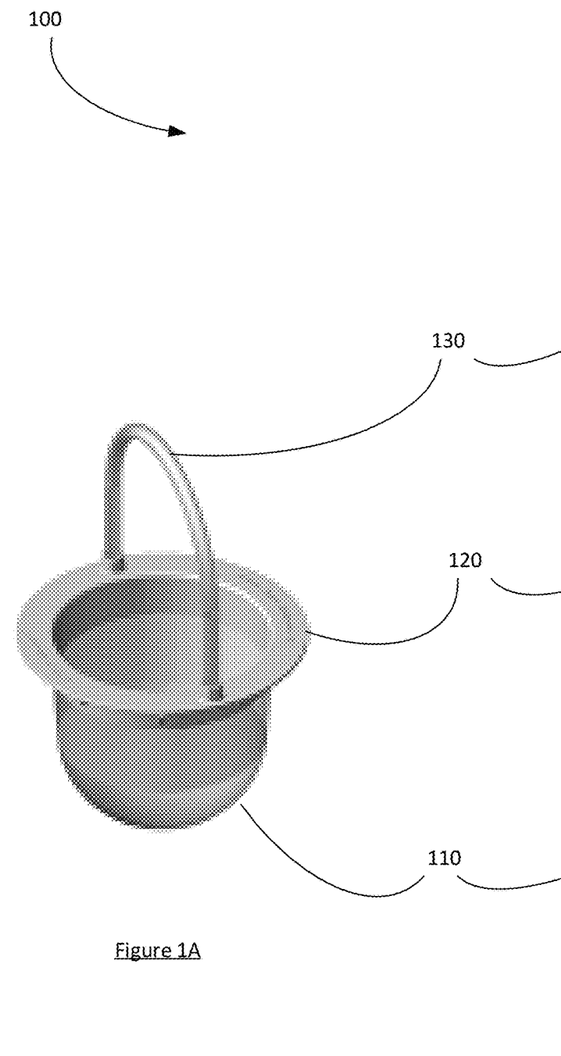
FIG. 1A illustrates an example swimming pool filter basket, according to an embodiment of the disclosure.
Figure 1B:
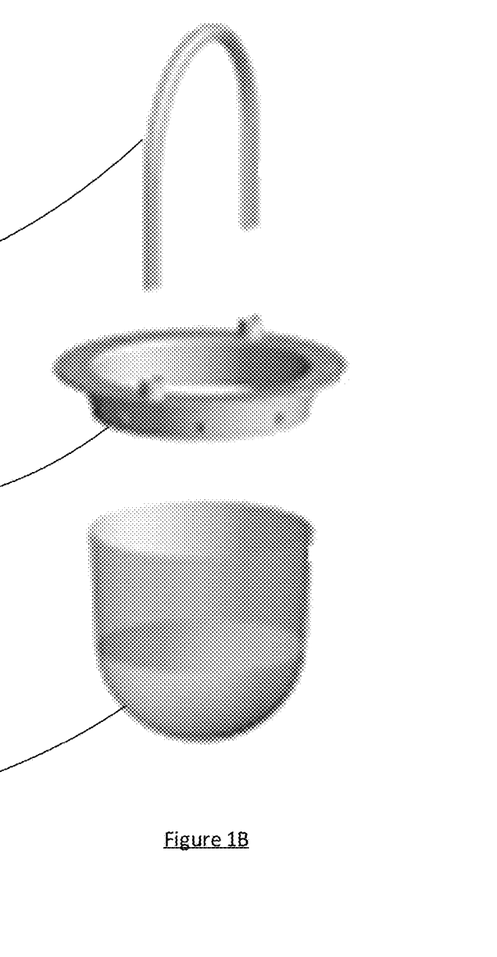
FIG. 1B illustrates an example swimming pool filter basket, according to an embodiment of the disclosure.
Figures 1C, 1D:
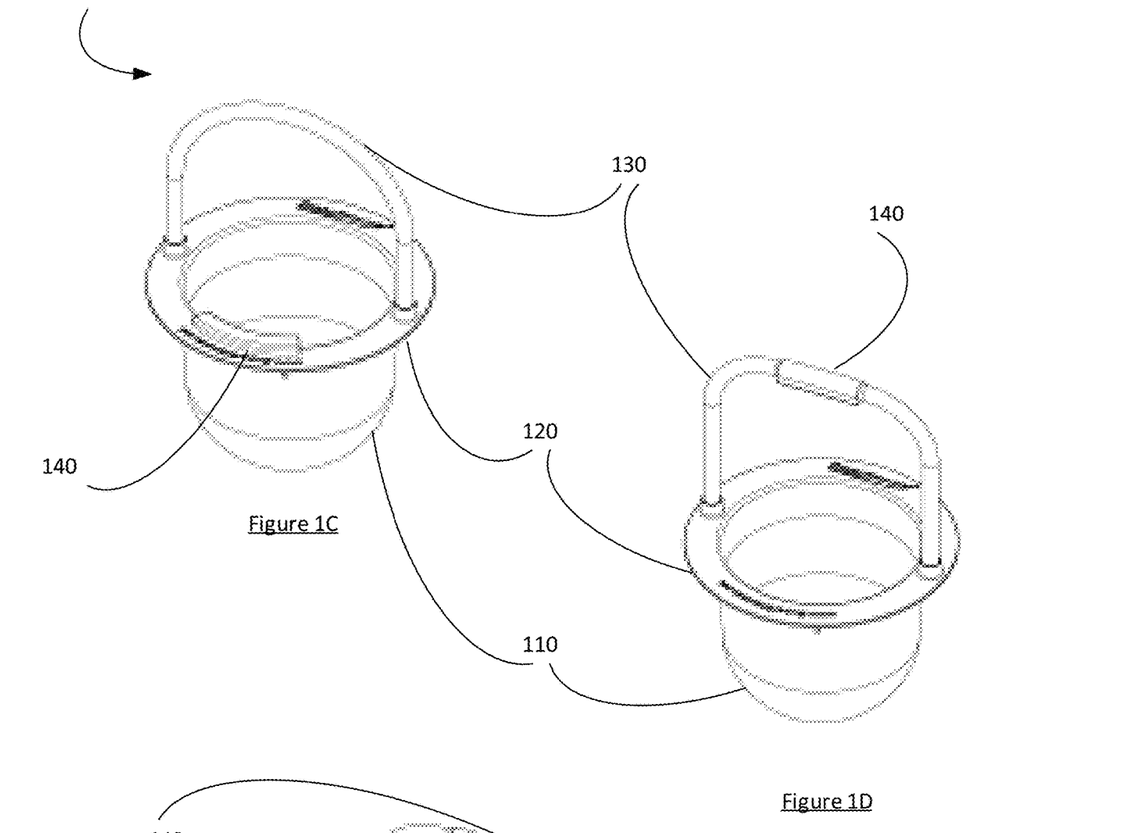
FIG. 1C illustrates an example swimming pool filter basket, according to an embodiment of the disclosure.
FIG. 1D illustrates an example swimming pool filter basket, according to an embodiment of the disclosure.
Figure 1E:
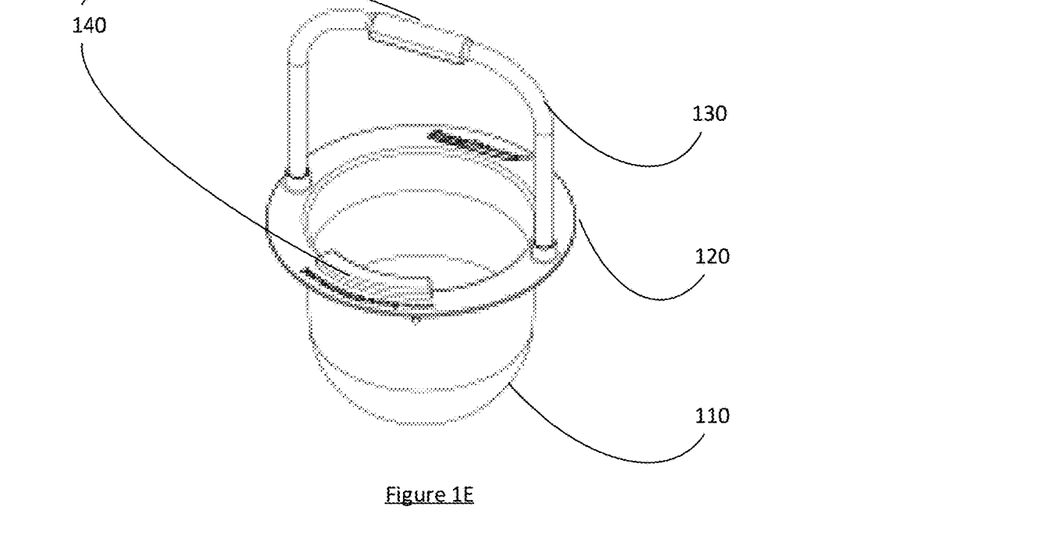
FIG. 1E illustrates an example swimming pool filter basket, according to an embodiment of the disclosure.

FIGS. 1A and 1B depict an example swimming pool filter basket 100. According to an embodiment of the disclosure, the basket 100 can include netting 110. Netting 110 can be composed of a pliable high-density polyethylene (HDPE), low-density polyethylene (LDPE), or other plastic material suitable for aquatic filtration use. These plastic materials, like HDPE and LDPE, are more durable than traditional materials previously used for filter baskets. They have the strength required to withstand long-term exposure to the elements, heat and cold and sunlight, long-term use in chlorine or saltwater pools, and long-term pressure exerted by the weight of the debris repeatedly caught in the netting 110, as well as the constant flow of water through the basket 100. The plastic used in the components, including netting 110, rim 120, and handle 130, can be a blend of plastic with additives. In some embodiments, the plastic can be mixed with glass, fiberglass, carbon fiber, and metal, to name just a few, in order to add to or strengthen the characteristics of the plastic. The basket 100 also includes rim 120. Rim 120 fits into the basket-holding cavity of the swimming pool. Rim 120 can be composed of HDPE or other plastic material. Rim 120 can also be composed, in whole or in part, of aluminum, stainless steel, or other rust-resistant metal. Rim 120 can be composed of both plastic and metal parts; for example, posts and screws can be metal while washers and bands can be plastic, or vice versa. Netting 110 and rim 120 can be coupled together to ensure the strengths of each component are not weakened at the coupling. This coupling can be permanent, such that neither netting 110 nor rim 120 can be removed from the coupling without causing damage to the basket 100. In some embodiments, a more permanent coupling can be achieved through sonic or heat welding the netting 110 and rim 120 together. But the coupling can also be of a replaceable nature, such as holding the netting 110 tight against rim 120 through use of an elastic or non-elastic band or strap, whether sewn to the netting 110 or otherwise, together with other mounting components, to secure the netting 110 to the outside circumference of the rim 120. In other embodiments, rim 120 can include at one or more posts extending outward from its outer circumference, and netting 110 can include gaps which fit over the rim posts and allow netting 110 to hang from rim 120. In one embodiment, rim 120 can include 8 posts evenly spaced circumferentially around the outside surface of rim 120. In another embodiment, rim 120 can include a clasping ring that snaps to or otherwise couples to the outside circumference of rim 120 and secures netting 110 between the outside circumference and the clasping ring. These various mounting components, posts, clasps, snaps, etc. can be composed of plastic or rust-resistant metal, as described above; and rim 120 can include a combination of rust-resistant metal and plastic posts, screws, etc. In some embodiments, one or more of the above-described couplings can be implemented together. For example, in one embodiment netting 110 can include gaps in the net to be hung on posts extending from rim 120. In that same embodiment, an elastic or nonelastic band or strap can then be tightly fitted around the outside circumference of rim 120, securing netting 110 to rim 120 both by the posts and the elastic or nonelastic band. In yet another embodiment, netting 110 can be coupled to the device by fitting the net material between two rims of varying designs, and then applying a sonic weld, a suitable adhesive material, nuts, bolts, screws, or other suitable fashion such that netting 110 and rim 120 become one unit.

Still with reference to FIGS. 1A and 1B, the filter basket 100 can also include handle 130. Handle 130 can be composed of HDPE, LDPE, or other suitable plastic or similar material. Handle 130 can also be composed, in whole or in part, of aluminum, stainless steel, or other rust-resistant metal. Without limiting the composition of handle 130, handle 130 can include a spine of rust-resistant metal. Whichever construction is used, handle 130 can withstand the tensile forces acting on it, for example, by manipulation. Handle 130 can be coupled to rim 120 such that handle 130 is extended at all times, or handle 130 can be operable to contract or fold down alongside rim 120. In some embodiments, handle 130 can be pivoted into general alignment with rim 120 and can fit "within" rim 120 in embodiments where rim 120 includes a recess to allow for the handle 130 insertion. In one embodiment, hinges can be used to contract or fold down handle 130, and the hinges can be composed of plastic or similar material, or rust-resistant metal, or both. When folded down, for example, handle 130 can allow for use of a lid or other covering, either for basket 100 or for the cavity, or for both.

With continued reference to FIGS. 1A and 1B, netting 110 can be created from a single swatch of net material. In this way, netting 110 would not require any seams from combining multiple swatches of net material. This seamless embodiment therefore removes the inherent weakness of the seams. In one embodiment, netting 110 can be formed from a pattern of net material which creates one or more pleats 160 in netting 110. The pleats can allow for passive expansion of netting 110 and permit additional debris from being captured in the basket 100. In another embodiment, netting 10 can be formed from a pattern of net material which does not create any pleats in netting 110. This can be preferred over other embodiments for aesthetic or other purposes. Netting 110 can also contain sewn, heat-welded, sonic-welded, or other suitably connected areas such that the strength of the net material is maintained for the basket's intended use and purpose.

Netting 110 can include holes of varying sizes. In some embodiments, netting 110 can include holes of virtually the same size as traditional skimmer baskets. In other embodiments, netting 110 can include holes much smaller than traditional skimmer baskets. In one embodiment, netting 110 can be composed of holes with diameters in the range of approximately 0.5 millimeters to 2.5 millimeters. The holes can be essentially homogeneous such that all holes can be, for example, very near to 1.0 millimeter in diameter. In another example, the holes can be heterogeneously sized in order to maximize the flow of water through the holes. In another embodiment, the holes can have diameters of approximately 3 millimeters. In some embodiments, netting 110 can include larger holes in order to filter larger debris such as leaves, twigs, and insects. In other embodiments, netting 110 can include smaller holes in order to maximize filtration of smaller particulate matter such as seeds, tree pollen, sand, and other debris from organic or inorganic sources.

In some embodiments, the pliable or flexible strands of netting 110 can be extruded from plastic materials which have noncorrosive properties such as polyethylene, polypropylene, or polyester. These noncorrosive plastic materials also resist chemicals commonly found in swimming pools, including chlorine, diluted muriatic acid, alkaline powder, diatomaceous earth (DE), etc. These plastic materials are also weather and UV resistant, and can withstand a wide range of heat d cold created by various weather conditions to maintain the proper filtration properties of the netting 110.

The plastic strands can be formed into a mesh pattern by interweaving the netting strands into an interlocking grid pattern of varying circular or noncircular hole sizes in a repeating pattern. In some embodiments, the mesh can be comprised of interconnected strands of metal, fiber, plastic, or other flexible or ductile materials. A plastic mesh may be extruded, oriented, expanded, woven, or tubular. It can be made from polypropylene, polyethylene, nylon, PVC, or PTFE. Polypropylene is rugged and unusually resistant to many chemical solvents, bases and acids. Polyethylene is somewhat softer and more flexible than polypropylene. For more extreme environments, polyester blends may be required. Polytetrafluoroethylene (PTFE) offers both anti-stick and high-temperature features but is only available in expanded mesh form in narrower roll widths.

Since the netting 110 is perforated as well as stretchy, the stretching of it can create a heterogeneous mix of differently sized holes. These differently sized holes make the filtering more efficient by allowing more water to pass through it in areas that are stressed by more debris. To capture the varying sizes of swimming pool debris that float on the surface of the pool water, the perforations or holes formed in the woven interlocking net strands are typically up to $\frac{1}{16}$ of an inch (1.6 mm) or smaller. Net 110 hole sizes larger than $\frac{1}{16}"$ can be used even though larger net perforations or holes may provide less filtration functionality.

In a passive state with no pressure applied, the constant or varying pattern of hole sizes in the interwoven netting material is uniform and homogenous. In some embodiments, netting 110 can be composed of material that does not include expansive properties and, in these embodiments, netting 110 can passively expand and contract based on overlapping pleats 160 of material. The pleats 160 unfold when water and/or debris pressure is applied from within the basket 100 and, when this pressure decreases, the pleats 160 inherently and passively fold back on themselves. In some embodiments, due to the inherent pliability and flexibility of the strands formed by the chemical and weather resistant plastic materials, the netting 110 can passively expand and contract as uniform or non-uniform pressure is applied to the netting 110. No outside actor, human or otherwise, need be involved to expand netting 110; only the inherent properties of the material and the pressure applied by the water and/or debris need act to stretch netting 110. No human or other interaction is required for the net's 110 surface area to increase. Similarly, after the need for a larger surface area has passed, the net material inherently contracts back to its original surface area after the basket 100 is emptied of debris.

When pressure or pulling of various intensities and tensions is applied, the holes in the interwoven net materials allows the fabric to stretch unilaterally, bilaterally, or multilaterally up to about 40% from its original state. (The plastic material from which the net 110 is made does not stretch.) When the interwoven material is stretched, the holes in the interwoven material become smaller at the most intense point from which the stretching tension is applied. The holes become larger the farther away from the center of tension that one goes. The maximum holes size is the size of the holes existing when the plastic interwoven mesh material is in its original passive, resting state.

Netting 110 can be commercially constructed with holes of approximately $\frac{1}{16}$ inch in size when in a resting state. In addition, the netting 110 itself is woven into an interlocking mesh knitted with heavy polyethylene (HDPE or LDPE) plastic thread materials or other equally chemical and UV resistant materials. The "threads" that are used in the process of making the net material have a slight rigidity that allows it to be shaped and formed into the desired net basket configuration. The interlocking weave pattern of the net 110 allows it to passively expand or contract when pressure is applied to the net material, such as when various types of blunt, pointed, jagged, smooth, round, light, heavy or other configurations and types of swimming pool debris are trapped in the basket 100 as water is circulated through it at various intensities. In addition, the threads used in the net construction process are still flexible enough, when combined with the interlocking weave of the netting 110, to allow the net 110 to passively expand as the net fills with debris due to the water pressure created by the circulation of pool water.

The passive expandability of the debris netting material that forms the net basket 100 enables the net basket to stretch within specified limits, allowing more efficient debris collection under varying pressure as water is drawn through the net basket by, for example, the swimming pool's electric pump system. In addition, the net basket 100 can contain more debris than other skimmer baskets that are made of hard, inflexible material. In an empty state, a debris basket is loosely formed into the basket shape when connected to the lower housing of the skimmer basket rim 120. In this empty state, the basket formed by the net 110 can be shaped, turned inside out or hung loosely under the water in the skimmer cavity. When the basket 100 begins to fill as debris is circulated into the skimmer cavity and subsequently into the skimmer basket 100, the basket shape changes from a loosely formed basket to a much more defined, round, smooth shape, allowing debris collection to be maximized. This is in contrast with skimmer baskets made from hard plastic materials, which have no ability to collect debris material beyond the basket's exact capacity at its resting state due to the rigidity of the materials used. When netting 110 is stretched to full capacity and tightly packed with leaves, twigs, pine needles, and other organic and inorganic matter, the round shape allowed by the passive expandability of the net material allows for more efficient and effective collection of debris material. The metamorphosis of the basket shape from loose to defined is created by debris that is naturally packed along the walls, bottom, and the surface areas of the netting 110 by uniform and non-uniform pressures from within the netting cavity caused from the circulatory flow of the water from the swimming pool pump at various water pressures and intensities.

The actual construction of basket 100 can lend itself to additional passive expansion ability. The construction of the net basket 100 can start with a uniform unbroken section of netting cut in the size necessary to form the basket based on the height and depth specifications required to form the basket. Various sizes and configurations of net sheets can be used since baskets 100 of various sizes can be made to fit various rim sizes and related lower housings as needed. The continuous sheet is cut to size and needs no further cuts are made such that the netting remains in one contiguous piece, requiring no other sewing, binding, fusing, or other attachment. In some embodiments, however, attachment can be made, for example, around the top edges of the netting 110. The net 110 can be formed using the following technique, although other techniques, including sewing strips of netting together to required specifications, may be used to accomplish the same net basket 100 configuration:

1. If the net 110 is manufactured using a single sheet of netting, the piece of netting that is to be used to form the net is laid flat on a hard surface or held in such a manner as to accomplish the formation of the net basket.
2. In order to form the net 110, the outer edges around the top of the net is gathered into a series of uniform or non-uniform gatherings, folds, tucks, puckers or plications (otherwise commonly known as "pleats") 160 along the upper edge of the netting such that the upper edge of the net 110 is formed into a circular configuration in the same diameter as the lower rim 120 housing to which the net 110 is to be permanently or removably attached.
3. The pleats 160 along the upper edge of the netting can be held in place by sewing, binding, fusing, or such other technique as to assure that the gatherings, folds, tucks, puckers, or plications remain in place throughout the commercial life of the basket 100. In some embodiments, a knife pleat 160 can be used in netting 110 by pressing the pleats 160 in a single direction, for example. These pleats 160 can have one side (the over-pleat) longer than another side (the under-pleat). In some embodiments, the under-pleat can be approximately half the width of the over-pleat which is conducive in the netting 110 lying flat. In other embodiments, one or more other pleats 160 can be used in manufacturing or engaging netting 110 and basket 100, in addition to knife pleats. These other types of pleats 160 can include, but are not limited to, accordion pleats, box pleats, inverted pleats, and kick pleats, to name a few.
4. Another basket 100 configuration includes features the top of the basket is open, and the remainder of the basket is closed to enable the capturing of debris. In this configuration, additional passive expansion can occur since no other cut, seam, fusion, or connection exists except for that which is along the outer edges of the netting 110. This is accomplished because the pleats 160 also passively expand and contract within specified limits as the skimmer basket 100 is partially or fully filled with pool debris. This is in addition to the expansion occurring in the basket netting 110 as previously discussed above.

With at least two different sizes of rim 120 and a flexibly sized netting 110, the net basket system described here can accommodate a variety of different pool filter sizes and styles. The net portion 110 can be attached to the lower housing in a manner which provides a secure connection to enable the basket 100 to withstand water pressures, debris weight, and other filtration forces created by water and debris being drawn from the pool thru the skimmer cavity and various speeds by the electric pool pump as previously described.

The rims 120 are manufactured in a variety of outside diameters to properly fit various skimmer cavity enclosures. Skimmer baskets 100 can vary in size, with outside diameters typically ranging from, but not limited to, as low as five inches to as much as eight-and-one-half inches or more. The outside diameters of rims 120 can fit various makes and models of skimmer units, and the inside diameters of basket 100 can have fewer inside diameter variations. For example, a skimmer basket rim 120 with outside diameters 8, 8.125, 8.25, 8.375 and 8.5 inches can all have the same inside diameter of approximately 6 inches without affecting the efficiency or effectiveness of basket 100 in the performance of its functions within the filtration systems of the swimming pool. The same is true, with the smaller inside diameters of the 7-, 6-, and 5-inch diameter models that match a greater number of outside diameters of basket 100.

The diameters of certain models of nets 110 can be manufactured to fit specific lower housing unit diameters. These certain models of nets 110 may be removable and replaceable. As such, these replaceable nets 110 may be interchangeable with more than one model of rim 120. As additional net 110 styles, capacities, filtration granularities, net materials, strengths, and other variations of nets are manufactured, they can be interchangeable with various models of outside rim diameters with matching inside rim diameters. This unique feature allows customers, vendors, and distributors the ability to use multiple rims with common net sizes. It also allows easy modification of nets 110 to replace old nets as skimmer manufacturers improve, change, or modify their product to allow higher volumetric capacities, higher water flow capacities, and other evolutionary improvements over time based on market demands. The customer can keep the same rim 120 and swap out the replaceable net basket portion of basket 100 to newer models of nets 110 as they are made available in the market. In addition, in the event of damage or other events that may compromise the filtration or other operational integrity of the original net 110, replacement nets 110 can be purchased and installed for models with replaceable nets.

Referring now to FIGS. 1C, 1D, 1E, and 1H, shown are other embodiments of swimming pool filter basket 100. Included in the configuration, along with netting 110, rim 120, and handle 130, is light source 140. A light source 140 is useful when a pool owner needs to look into the filter cavity that is dark and cannot, or do not want to, bring an independent light source with him/her. Light source 140 can be incorporated into basket 100 via handle 130, via rim 120, or via both the handle 130 and rim 120. Light source 140 can be used at any time, and may be most visible at times of lower natural light. Light source 140 can be attached to any part of the filter basket 100 or inside the skimmer cavity. In some embodiments, light source 140 can be attached to the interior body of basket 100 or a covering, such as a lid. Light source 140 can be powered by a variety of methods including, but not limited to, battery cell, solar power, hydroelectric power, and traditionally or non-traditionally generated electric power, individually or in combination. In some embodiments, light source 140 can include light-emitting diode (LED) bulbs, fluorescent bulbs, incandescent bulbs, reflecting surfaces, and materials that glow in the dark, individually or in combination.

For existing pools, one solution to illuminating a skimmer filter cavity is to have a light source 140 or other illumination installed into the handle, rim, or other part of the skimmer basket assembly, in or on the skimmer cavity, or imbedded in the skimmer lid. The lights 140 must be waterproof and capable of withstanding uninterrupted submersion in swimming pool water that has been chlorinated, treated with salt, or otherwise treated with chemicals sufficient to provide a safe and clean swimming pool water environment according to recommendations and guidelines of pool contractors, swimming pool supply stores, and nationally recognized swimming pool institutes such as the Association of Pool and Spa Professionals.

The illuminations 140 should be bright enough to allow the pool owner to view the inside of the skimmer cavity to allow safe and efficient removal of the full or partially full skimmer basket 100 in a manner that minimizes the risk of touching the debris in the skimmer basket 100 or being touched by live or dead matter in the skimmer basket 100. The illuminations 140 can be comprised of, but not limited to, the following:

contiguous or non-contiguous strings of lights separated (or not separated) by intervals of wiring
one or more individual illuminations
or any combination of the above
types, including incandescent, LED, fluorescent, CFL, halogen, and similar types
white, multicolored, variable illumination colorations
constant, intermittent, timed, flashing, strobed, or variable illumination
battery-powered
solar-powered
electrically powered provided it is installed in a safe manner designed for underwater applications
hydraulically powered
powered by another approved underwater power source
non-electrically illuminated sources, such as florescent "crack and glow" sticks or other similar media The lights 140 can be turned on and off by remote control, switches, buttons, touch or non-touch sensors, motion sensors, or sound, in a manner that allows the illumination 140 to turn on when needed and turn off when not needed, automatically or manually.

For pools in the process of being constructed or remodeled, the above solutions can be incorporated into the skimmer assembly 100 in a manner that allows the wiring of the lights to be incorporated or integrated with the other electrical, hydroelectric, solar or any other types of energy systems of the pool. This would involve lights 140 of various types and styles being illuminated by switches, circuits, timers, and other similar methods of providing power to illuminate the lighting 140 to the skimmer cavity, skimmer basket 100 or lid, to name a few. These would be installed during construction, remodeling, or at other such times as access could be obtained to underground and above ground electrical, solar hydroelectric or other quantum power sources. The lights 140 can be various intensities of luminous brightness, including, but not limited to, a range from 250 lumens to 2600 lumens. In embodiments utilizing self-contained fluorescent light sources 140 that absorb direct or indirect light and provide light independent of power sources, illumination 140 may also be used to illuminate said pool components for existing swimming pools as well as new pools under construction or being remodeled.

Figure 1F:
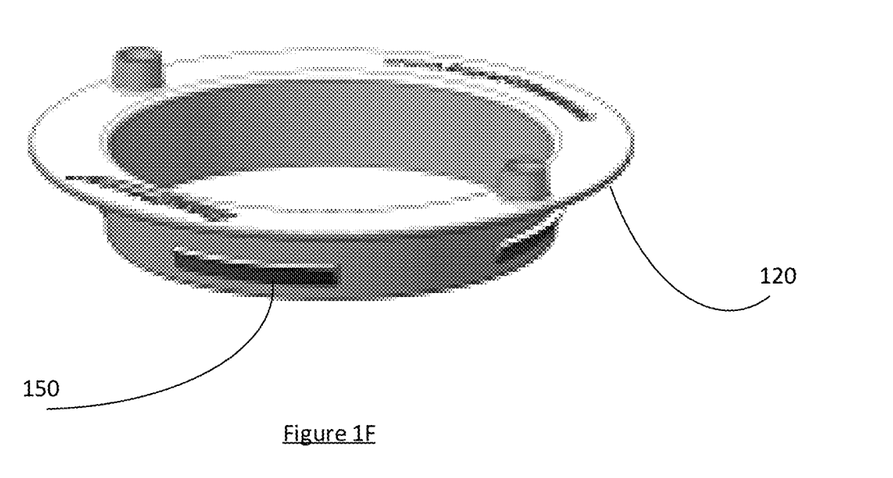
FIG. 1F illustrates an example basket rim, according to an embodiment of the disclosure.
Figure 1G:
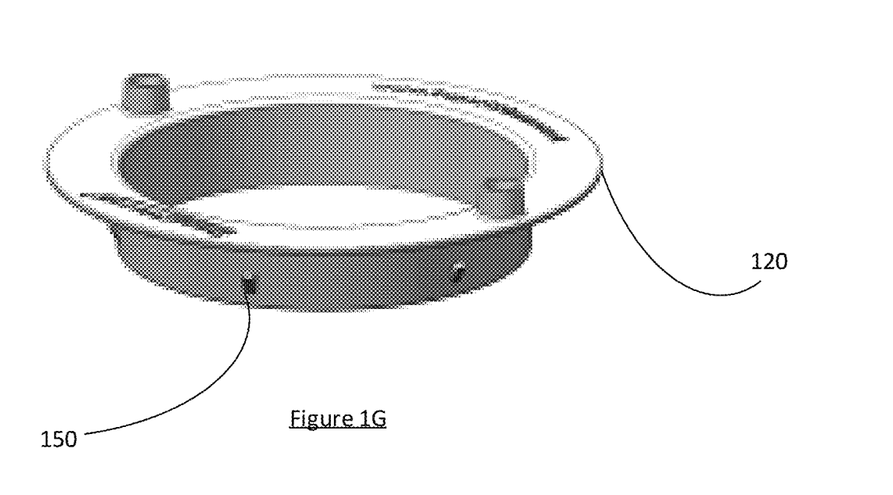
FIG. 1G illustrates an example basket rim, according to an embodiment of the disclosure.
Figure 1H:
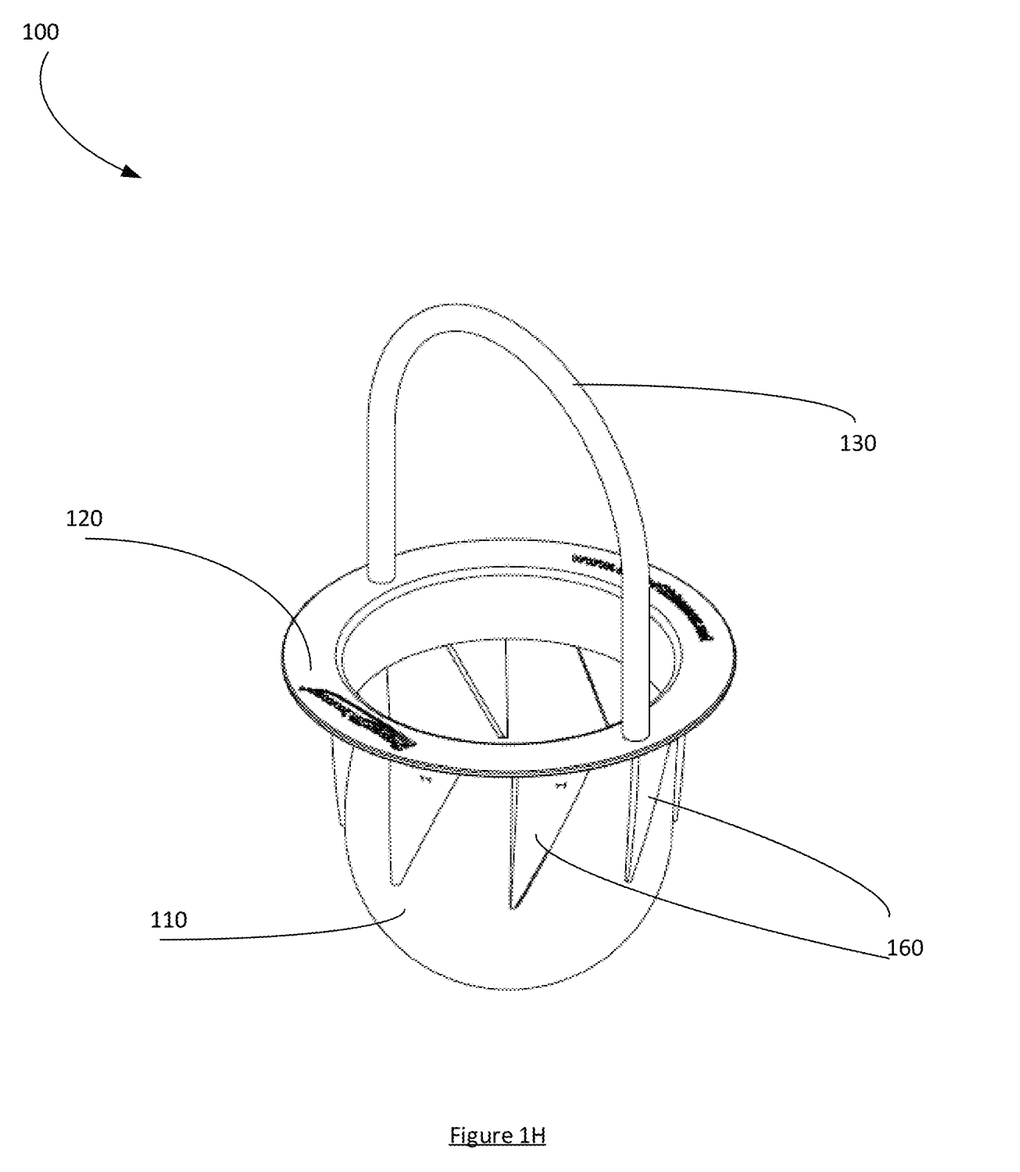
FIG. 1H illustrates an example swimming pool filter basket, according to an embodiment of the disclosure.

Referring now to FIGS. 1F and 1G, shown are embodiments of rim 120. To secure netting 110, rim 120 can include notches 150. Notches 150 can be of varying size, design, and placement, and can serve to wedge or hook netting 110 securely with rim 120. In some embodiments, notches 150 can be the sole coupling mechanism between rim 120 and netting 110. In other embodiments, notches 150 can fit against another rigid surface with netting 110 in between, thereby holding netting 110 in place. In some embodiments, notches 150 can be of a size not greater than the area of the holes in netting 110, and can serve as "hooks" from which netting 110 hangs from and is attached to rim 120.

Other embodiments of filter basket 100 can include one or more secondary filtration devices. Secondary filtration devices can manually or automatically trap debris in the filtration cavity of the swimming pool, for example, when a filter basket 100 has been removed. Secondary filtration devices can include a dip net to scoop or otherwise clean debris from the filter cavity. In some embodiments, secondary filtration can include a shaped net situated below filter basket 100. In some embodiments this secondary net, for example circular in shape, can be removably attached to filter basket 100, such that removal of either basket 100 or the secondary net from the cavity does not necessarily include removal of the other from the cavity. The secondary net can be constructed of plastic or similar material, metal, fabric, or resins of various types, among other constructions suitable in a swimming pool environment.

Figure 2:
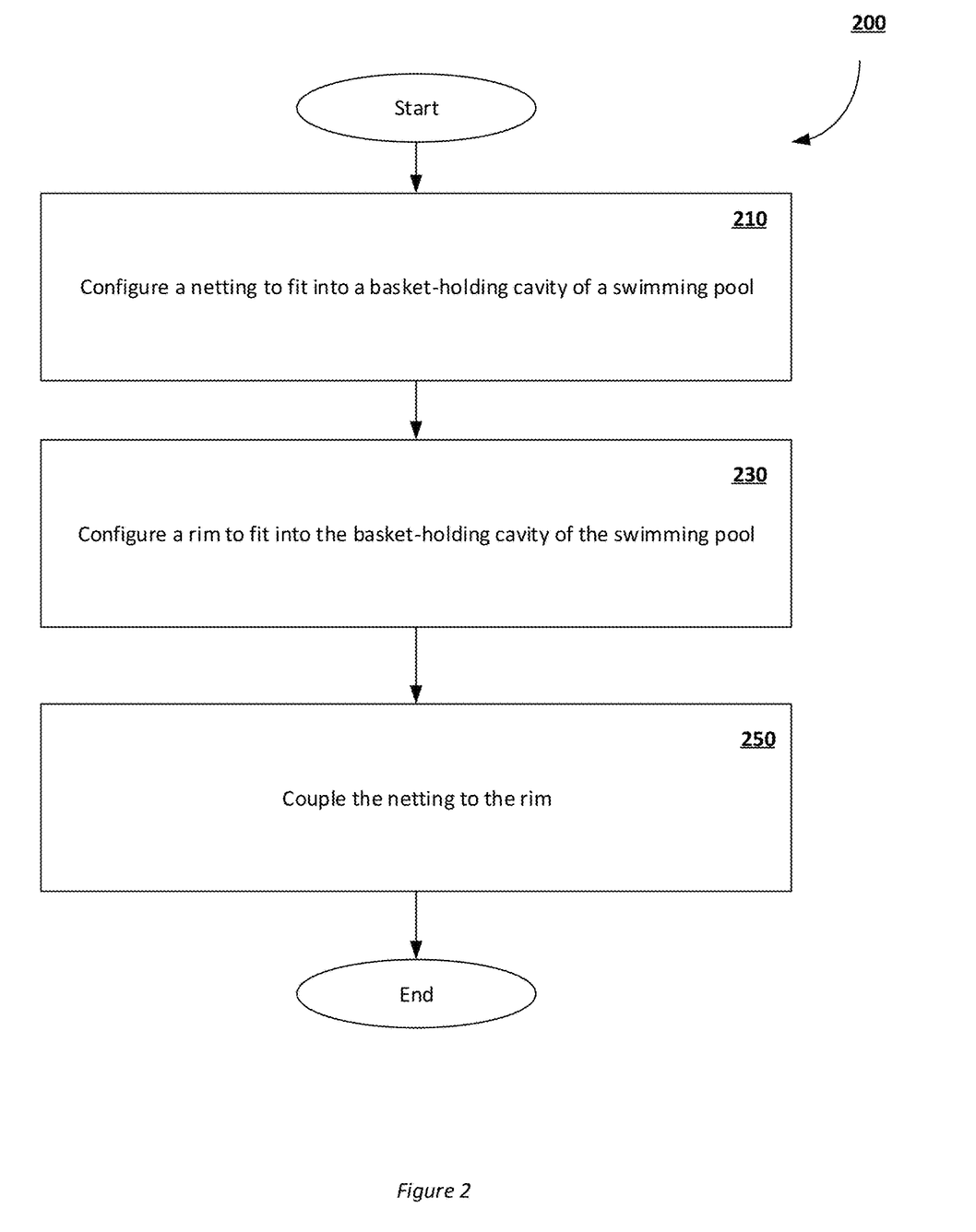
FIG. 2 is a functional block diagram illustrating an example method of creating a swimming pool filter basket, according to an embodiment of the disclosure.

Referring now to FIG. 2, shown is a flow diagram of an example method 200 for configuring a swimming pool water filter basket, according to an illustrative embodiment of the disclosure. The method can be utilized with various apparatus, such as the swimming pool filter basket 100 illustrated in FIG. 1.

The method 200 can begin at block 210. At block 210, a netting can be configured to fit into the basket-holding cavity of a swimming pool. The cavity can be of a universal size, or it can be of a different size that fits the netting. The netting can be composed of a plastic material such as HDPE, LDPE, or other suitable plastic, or resin material. The netting can be configured such that the netting has pleats 160 when it is coupled to a rim; or the netting can be configured such that there are no pleats or folds in the netting after it is coupled to the rim. The netting can also be configured to have holes much smaller than the traditional diameter size of filter basket holes. For example, the netting holes of this disclosure can have diameters in the range of approximately 0.5 mm to 2.5 mm, with a homogeneous or heterogeneous distribution of the hole sizes. Additionally, the netting can be configured without seams, such that the strength of the netting is not compromised by the seams.

Next, at block 230, a rim can be configured to fit into the basket-holding cavity of a swimming pool. The cavity can be of a universal size, or it can be of a different size that fits the rim. The rim can be composed of a plastic material such as HDPE, LDPE, or other suitable plastic, or resin material. The rim can also be composed of aluminum, stainless steel, or other rust-resistant metal. The rim can be coupled to a handle; and the handle can be operable to fold down into being part of the rim.

Next, at block 250, the netting and the rim can be coupled together. The coupling can be permanent or it can be removable, for example, in the interest of replacing one or another part. The netting and rim can be coupled together through sonic welding or heat welding, or with the aid of an adhesive. Alternatively or in concert, the coupling can be achieved through the use of prongs extending from the outside circumference of the rim, such that the netting can contain gaps that fit around these prongs, and the netting hangs from the rim. The prongs can be shaped to prevent the netting from sliding back off the prongs. Alternatively, an elastic band can be stretched tight around the outside circumference of the rim such that the band squeezes the netting between the rim and the band. Yet another alternative in the coupling is to use a clasping ring that locks into place around the outside circumference of the rim and secures the netting between the rim and the clasping ring.

The method 200 can optionally end following block 250.

The operations described and shown in method 200 of FIG. 2 can be carried out or performed in any suitable order as desired in various embodiments of the disclosure, and the method 200 can repeat any number of times. Additionally, in certain embodiments, at least a portion of the operations can be carried out in parallel. Furthermore, in certain embodiments, fewer than or more than the operations described in FIG. 2 can be performed.

Now that these embodiments have been described,
The invention claimed is:

1. A swimming pool filter basket comprising:
a pliable netting comprised primarily of a plastic material;
the pliable netting operable to expand and contract passively; and
a rim coupled to the pliable netting, the rim to fit into a basket-holding cavity of a swimming pool.

2. The basket of claim 1, further comprising a handle coupled to the rim, the handle operable to pivot into a position in general alignment with the rim.

3. The basket of claim 2, wherein the handle is operable to provide illumination in the basket-holding cavity.

4. The basket of claim 1, wherein the pliable netting is seamless.

5. The basket of claim 1, wherein the pliable netting is operable to expand and contract based at least in part on pliable material.

6. The basket of claim 1, wherein the pliable netting is operable to expand and contract based at least in part on at least one overlapping pleat of material.

7. The basket of claim 1, wherein the pliable netting is configured with homogeneously sized holes, the homogeneously sized holes configured to collectively expand and contract into heterogeneously sized holes based at least in part on environmental pressure applied to the pliable netting.

8. A method of filtering a swimming pool, the method comprising:
configuring a pliable netting to be comprised primarily of a plastic material;
configuring the pliable netting to passively expand and contract; and
configuring a rim to be coupled to the pliable netting; and
configuring the rim to fit into a basket-holding cavity of the swimming pool.

9. The method of claim 8, further comprising configuring a handle to be coupled to the rim, the handle operable to pivot into a position in general alignment with the rim.

10. The method of claim 9, further comprising configuring the handle to provide illumination in the basket-holding cavity.

11. The method of claim 8, further comprising configuring the pliable netting to be seamless.

12. The method of claim 8, further comprising configuring the pliable netting to passively expand and contract based at least in part on pliable material.

13. The method of claim 8, further comprising configuring the pliable netting to passively expand and contract based at least in part on at least one overlapping pleat of material.

14. The method of claim 8, further comprising configuring the pliable netting with homogeneously sized holes.

15. The method of claim 14, further comprising configuring the homogeneously sized holes to collectively expand and contract into heterogeneously sized holes based at least in part on environmental pressure applied to the pliable netting.

16. A system of filtering a swimming pool, the system comprising:
a pliable netting comprised primarily of a plastic material;
the pliable netting operable to expand and contract passively;
a rim coupled to the pliable netting, the rim to fit into a basket-holding cavity of a swimming pool; and
a handle.

17. The system of claim 16, wherein the pliable netting comprises at least one pleat, the at least one pleat operable to passively expand and contract, the expansion and contraction based on pressure applied by water and debris.

18. The system of claim 16, wherein the pliable netting is selected from a group of pliable nettings of different sizes, the rim is selected from a group of rims of different sizes, and the selection of the pliable netting and the rim is based at least in part on size of the basket-holding cavity.

19. The system of claim 16, wherein at least one of the rim, the pliable netting, or the handle is configured to provide illumination to the basket-holding cavity.

20. The system of claim 16, wherein homogeneously sized holes of the pliable netting are configured to expand independently into heterogeneously sized holes and contract independently into homogeneously sized holes.

* * * * *